US012503339B2

(12) United States Patent
Wang et al.

(10) Patent No.: US 12,503,339 B2
(45) Date of Patent: Dec. 23, 2025

(54) CLEANING DEVICE FOR TRACTION BELT OF ELEVATOR AND ELEVATOR SYSTEM

(71) Applicant: Otis Elevator Company, Farmington, CT (US)

(72) Inventors: Wei Wang, Shanghai (CN); Ming Zhang, Shanghai (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 685 days.

(21) Appl. No.: 17/832,272

(22) Filed: Jun. 3, 2022

(65) Prior Publication Data

US 2023/0129178 A1 Apr. 27, 2023

(30) Foreign Application Priority Data

Oct. 27, 2021 (CN) ......................... 202111254516.5

(51) Int. Cl.
*B66B 7/12* (2006.01)
*B66B 7/06* (2006.01)

(52) U.S. Cl.
CPC ............ *B66B 7/1284* (2013.01); *B66B 7/062* (2013.01)

(58) Field of Classification Search
CPC ....... B66B 7/062; B66B 7/1284; B66B 19/00; B66B 7/1276; B08B 1/20
USPC ........................................................ 15/256.5
See application file for complete search history.

(56) References Cited

U.S. PATENT DOCUMENTS 5,386,882 A * 2/1995 Friend .................. B66B 7/1284 184/15.3
6,267,205 B1 * 7/2001 Piech ...................... B66B 7/062 187/292
10,669,125 B2 6/2020 Miyajima et al.
2007/0044267 A1 3/2007 Connolly
2021/0101784 A1 * 4/2021 Kato ..................... B66B 7/1276

FOREIGN PATENT DOCUMENTS

| | | | |
|---|---|---|---|
| CN | 1318505 | A | 10/2001 |
| CN | 102627206 | A | 8/2012 |
| CN | 103003182 | B | 6/2016 |
| CN | 103449280 | B | 6/2016 |
| CN | 106698149 | A | 5/2017 |
| CN | 206466858 | U | 9/2017 |
| CN | 206599338 | U | 10/2017 |
| CN | 207861661 | U | 9/2018 |
| CN | 207861663 | U | 9/2018 |
| CN | 108861933 | A | 11/2018 |

(Continued)

OTHER PUBLICATIONS

European Search Report for Application No. 22203662.6, Issued Mar. 9, 2023, 7 Pages.

*Primary Examiner* — Katina N. Henson
(74) *Attorney, Agent, or Firm* — CANTOR COLBURN LLP

(57) ABSTRACT

An elevator traction belt cleaning device and an elevator system. The elevator traction belt cleaning device includes: a set of slide rails installed to fixed positions in an elevator system; and a cleaning assembly having a cleaning opening for a traction belt to pass through, a sand removing member installed at the cleaning opening, and a set of slide blocks; in which the cleaning assembly is slidably installed between the set of slide rails through the set of slide blocks.

14 Claims, 3 Drawing Sheets

(56) References Cited

FOREIGN PATENT DOCUMENTS

| | | | |
|---|---|---|---|
| CN | 109264540 | A | 1/2019 |
| CN | 209455891 | U | 10/2019 |
| CN | 209507367 | U | 10/2019 |
| CN | 209507369 | U | 10/2019 |
| CN | 110872047 | A | 3/2020 |
| CN | 210457043 | U | 5/2020 |
| CN | 211366645 | U | 8/2020 |
| CN | 211393464 | U | 9/2020 |
| CN | 211419224 | U | 9/2020 |
| CN | 211644249 | U | 10/2020 |
| CN | 211920552 | U | 11/2020 |
| CN | 110002322 | B | 12/2020 |
| CN | 112125105 | A | 12/2020 |
| CN | 212403082 | U | 1/2021 |
| CN | 112456277 | A | 3/2021 |
| CN | 112499421 | A | 3/2021 |
| CN | 212832259 | U | 3/2021 |
| CN | 212863708 | U | 4/2021 |
| CN | 213085123 | U | 4/2021 |
| CN | 112875464 | A | 6/2021 |

* cited by examiner

CLEANING DEVICE FOR TRACTION BELT OF ELEVATOR AND ELEVATOR SYSTEM

FOREIGN PRIORITY

This application claims priority to Chinese Patent Application No. 202111254516.5, filed Oct. 27, 2021, and all the benefits accruing therefrom under 35 U.S.C. § 119, the contents of which in its entirety are herein incorporated by reference.

FIELD OF THE INVENTION

The present application relates to the field of elevators, and more specifically, the present application relates to an elevator traction belt cleaning device for use in an elevator system.

BACKGROUND OF THE INVENTION

As a tool for improving the walking of passengers between floors or shortening a walking distance of passengers, passenger transportation devices are very common in daily life. As an example, the most common passenger transportation devices are escalators and elevators that are usually used between floors of commercial buildings, and moving walkways that are usually used in large airports.

For an elevator system, it has an elevator car that usually runs in a dedicated hoistway and a counterweight configured to balance the operation of the elevator car. A traction belt and a pulley block are arranged between the two to achieve a balanced relative movement between them. In order to reduce the wear of the traction belt during the operation of the elevator system, a lubricating medium is usually added to it, so dust is easily adhered to the traction belt during use thereof and agglomerates into sand particles, which in turn causes problems such as traction belt bounce, thus affecting a stable operation of the elevator system.

To avoid such problems, a cleaning device is usually provided for the traction belt in the elevator system. For example, a fixed brush is used to scrape off the sand particles on the traction belt. However, in actual applications of the elevator system, considering the design and layout of various parts, it is difficult to achieve a completely vertical arrangement of the traction belt. This will cause a change in the distance between the traction belt and the cleaning brush when the traction belt with different positions passes through the cleaning device with a fixed installation position. The distance being too far will result in a poor cleaning effect, whereas the distance being too close will cause larger noises, and cause a faster wear speed of the brush, which in turn affects a service life and replacement cycle of the brush.

SUMMARY OF THE INVENTION

The present application aims to provide an elevator traction belt cleaning device and an elevator system so as to solve or at least alleviate some of the above technical problems.

In order to achieve at least one object of the present application, according to an aspect of the present application, an elevator traction belt cleaning device is provided, which includes: a set of slide rails installed to fixed positions in an elevator system; and a cleaning assembly having a cleaning opening for a traction belt to pass through, a sand removing member installed at the cleaning opening, and a set of slide blocks; in which the cleaning assembly is slidably installed between the set of slide rails through the set of slide blocks.

In addition to or as an alternative to one or more of the above features, in another embodiment, the elevator traction belt cleaning device further includes: a guide assembly, which is arranged close to the cleaning opening of the cleaning assembly, and which is configured to contact the traction belt passing through the cleaning opening, and guide the cleaning assembly to slide as the traction belt moves, so that a sand removing gap is maintained between the sand removing member and the traction belt.

In addition to or as an alternative to one or more of the above features, in another embodiment, the guide assembly is installed above and/or below the cleaning assembly.

In addition to or as an alternative to one or more of the above features, in another embodiment, the guide assembly includes at least one set of rolling members and at least one set of rolling member brackets; in which the at least one set of rolling member brackets are installed to the cleaning assembly, and the at least one set of rolling members are pivotally connected to the at least one set of rolling member brackets respectively; and a gap between the at least one set of rolling members is smaller than the gap of the sand removing member.

In addition to or as an alternative to one or more of the above features, in another embodiment, the guide assembly in the elevator traction belt cleaning device includes at least one set of support rods installed to the cleaning assembly; in which a gap between the at least one set of support rods is smaller than the gap of the sand removing member; and in which contact surfaces of the at least one set of support rods with the traction belt passing through the cleaning opening are configured as curved surfaces.

In addition to or as an alternative to one or more of the above features, in another embodiment, the at least one set of slide rails are configured as concave slide rails or convex slide rails, and the at least one set of slide blocks are correspondingly configured as convex slide blocks or concave slide blocks.

In addition to or as an alternative to one or more of the above features, in another embodiment, the elevator traction belt cleaning device further includes: noise reduction bushings, which are arranged on slide contact surfaces between the at least one set of slide rails and the at least one set of slide blocks and which are sleeved over the convex slide rails or the convex slide blocks.

In addition to or as an alternative to one or more of the above features, in another embodiment, the elevator traction belt cleaning device further includes: noise reduction liners, which are arranged on slide contact surfaces between the at least one set of slide rails and the at least one set of slide blocks.

In addition to or as an alternative to one or more of the above features, in another embodiment, the cleaning assembly includes a set of fixed arms; in which one of the set of slide blocks is configured to fix first ends of the set of fixed arms, and the other one of the set of slide blocks is configured to fix second ends of the set of fixed arms, and the set of fixed arms are spaced apart from each other to form the cleaning opening for the traction belt to pass through.

In addition to or as an alternative to one or more of the above features, in another embodiment, the cleaning opening has a constant opening size.

In addition to or as an alternative to one or more of the above features, in another embodiment, the sand removing member is configured as a sand removing brush.

In order to achieve at least one object of the present application, according to an aspect of the present application, an elevator system is provided, which includes: an elevator car; a counterweight; a traction assembly, which includes a traction belt connected between the elevator car and the counterweight; and the traction belt cleaning device as described above, which is fixedly installed in the elevator system on a movement trajectory of the traction belt; in which when the elevator system is running, the cleaning assembly slides as a position of the traction belt passing through the cleaning opening changes.

In addition to or as an alternative to one or more of the above features, in another embodiment, the traction belt cleaning device is fixedly installed to an upper beam of a truss or a counterweight installation bracket of the elevator system on the movement trajectory of the traction belt.

In addition to or as an alternative to one or more of the above features, in another embodiment, a sliding direction of the cleaning assembly corresponds to an inclination direction of the traction belt installed in the elevator system.

In the elevator traction belt cleaning device according to the present application, by providing a slidable cleaning assembly, the possibility of its associated movement with the traction belt is provided. When it is installed in the elevator system according to the present application, the cleaning assembly will move associatedly with swaying of the traction belt caused by the operation of the elevator system or a displacement caused by the installation inclination of the traction belt, so that the cleaning assembly always maintains a proper sand removing distance with the traction belt, which effectively takes into account both a sand removing effect and the noise of sand removing, and at the same time improves the service life and replacement cycle of the sand removing member.

DETAILED DESCRIPTION OF THE EMBODIMENT(S) OF THE INVENTION

Hereinafter, the present application will be described in detail with reference to exemplary embodiments in the accompanying drawings. However, it should be understood that the present application can be implemented in many different forms, and should not be construed as being limited to the embodiments set forth herein. These embodiments are provided herein to make the disclosure of the present application more complete and thorough, and to fully convey the concept of the present application to those skilled in the art.

In addition, for any single technical feature described or implied in the embodiments mentioned herein, or any single technical feature shown or implied in individual drawings, the present application still allows these technical features (or equivalents thereof) to be further arbitrarily combined or deleted without any technical obstacle, thereby obtaining more other embodiments of the present application that may not have been directly mentioned herein.

In order to facilitate describing the embodiments mentioned in this document, a length direction, a width direction and a height direction are introduced herein as a reference coordinate system. The description as to direction is intended to express relative position relationships between various parts, rather than restrictively constraining their absolute position relationships. Taking the elevator traction belt cleaning device installed in the elevator system as an example, the height direction refers to a running direction of the elevator in this case, and the length direction and the width direction refer to the length and width extension directions of the cleaning assembly of the elevator traction belt cleaning device respectively. The length direction generally refers to a direction in which the cleaning assembly has a longer size in the plane, and the width direction generally refers to a direction in which the cleaning assembly has a shorter size in the plane.

Figure 1:
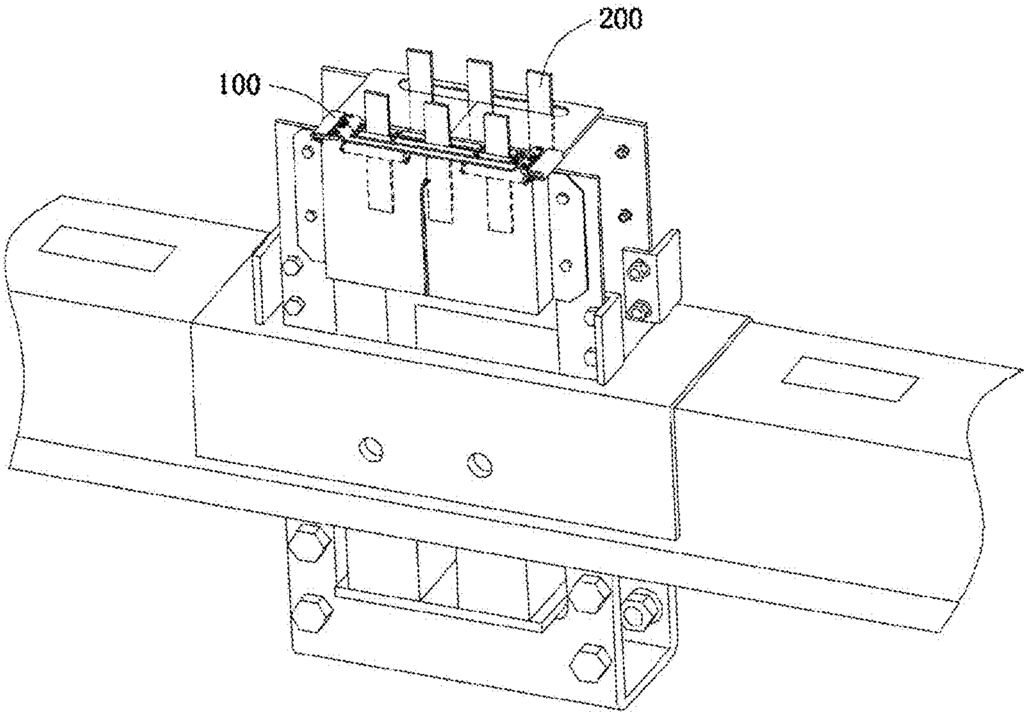
FIG. 1 is a partial schematic view of an elevator system, in which an embodiment of an elevator traction belt cleaning device installed in the elevator system is shown.
Figure 2:
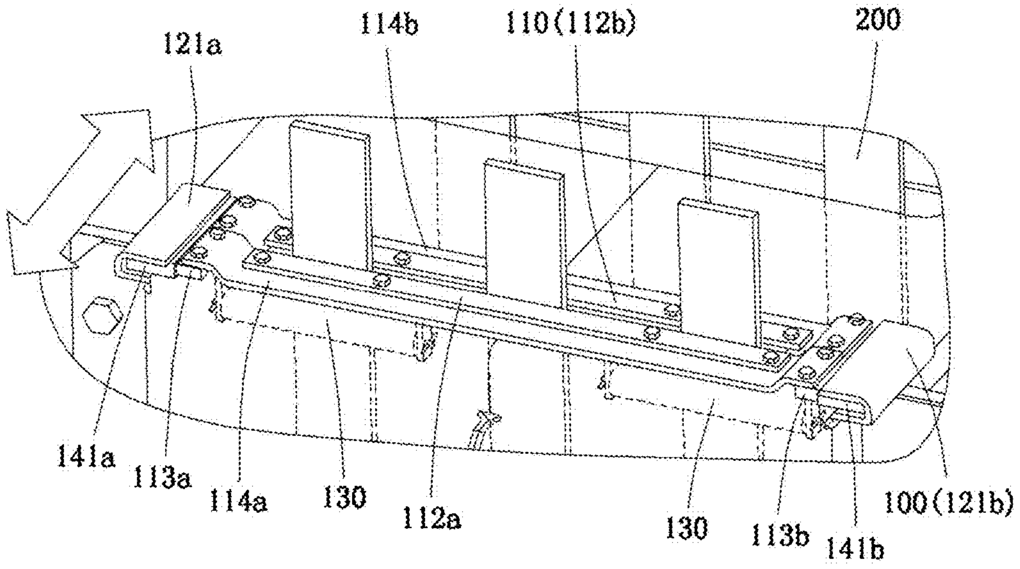
FIG. 2 is a partially enlarged schematic view of the elevator traction belt cleaning device in FIG. 1.
Figure 3:
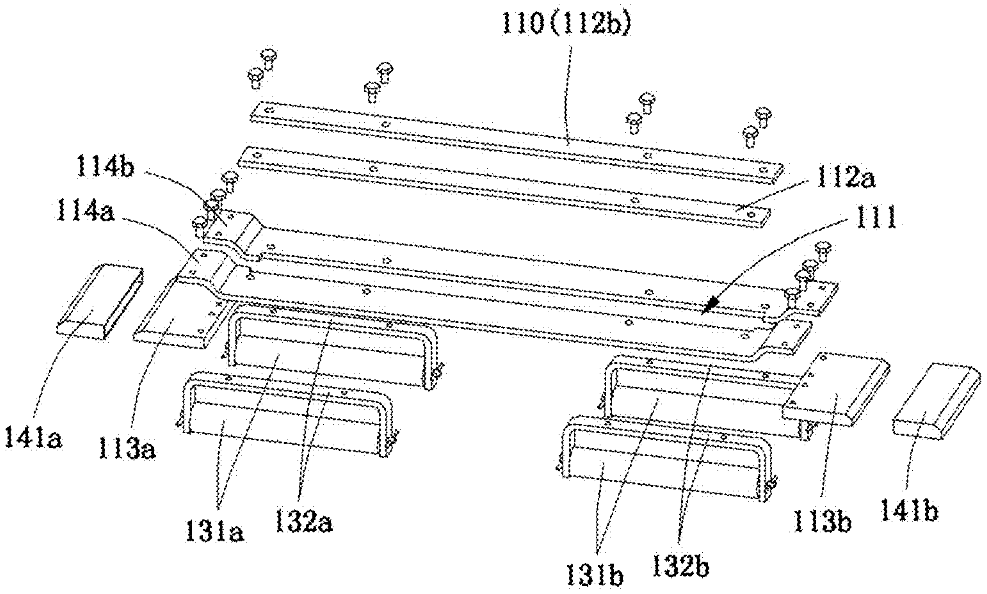
FIG. 3 is an exploded schematic view of an embodiment of the elevator traction belt cleaning device.
Figure 4:
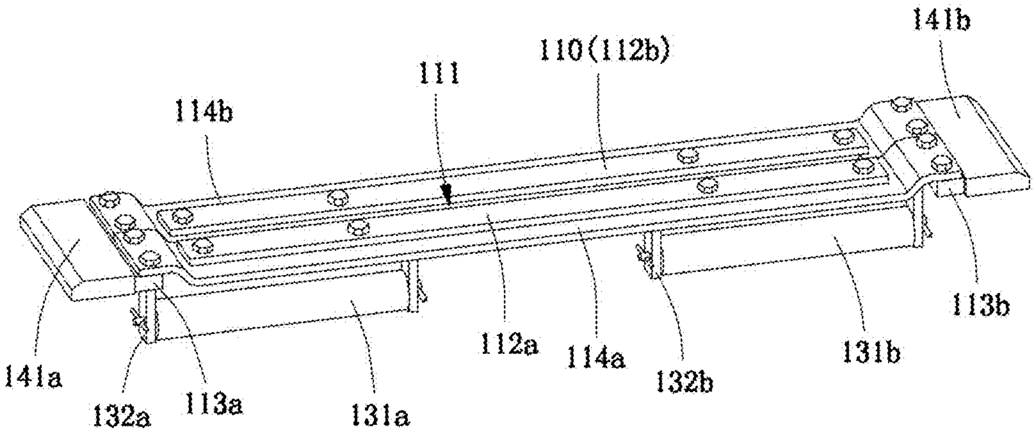
FIG. 4 is a schematic assembly view of the elevator traction belt cleaning device in FIG. 3 from a first perspective.
Figure 5:
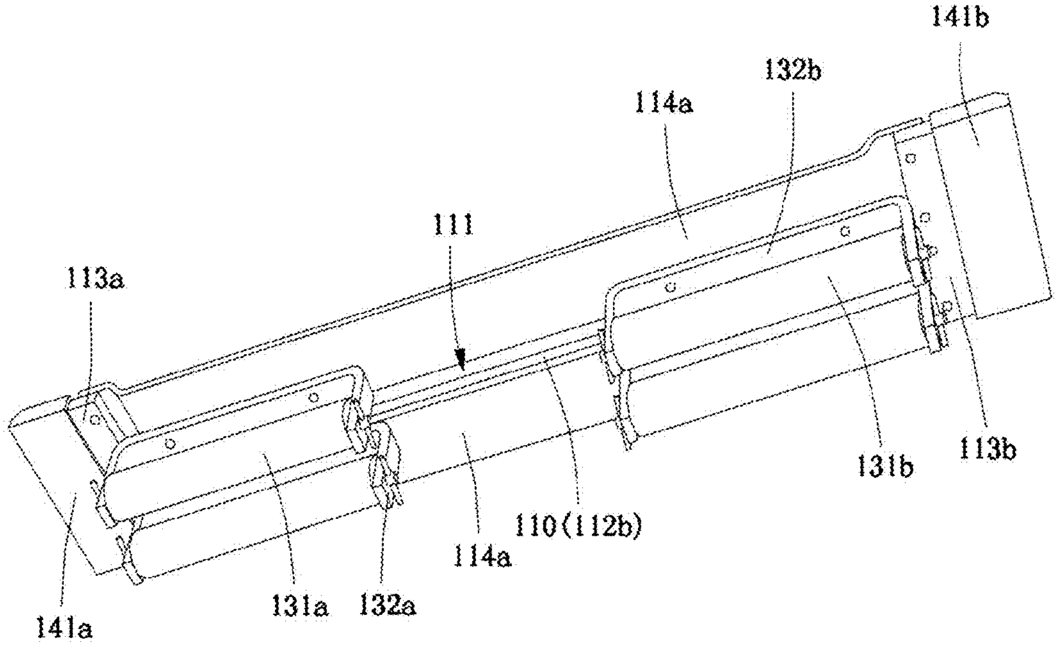
FIG. 5 is a schematic assembly view of the elevator traction belt cleaning device in FIG. 3 from a second perspective.

In the present application, the elevator traction belt cleaning device and its arrangement associated with the elevator system will be exemplarily described herein with reference to FIGS. 1 to 5, in which FIGS. 1 to 2 show the elevator traction belt cleaning device and its installation scene, and FIGS. 3 to 5 show various parts of the elevator traction belt cleaning device and their assembly relationships. The description will be expanded as follows.

Referring to FIGS. 1 to 2, the elevator traction belt cleaning device may be arranged on a counterweight installation bracket in the elevator system as shown in the figure, or arranged on an upper cross beam of a truss, which is not shown in the figure. Overall, it is sufficient to arrange the elevator traction belt cleaning device on a fixed component located around a movement trajectory of a traction belt 200 in the elevator system, so that the purpose of cleaning the traction belt can be achieved.

Referring to FIGS. 2 to 5 again, the elevator traction belt cleaning device 100 in this embodiment generally includes two parts: a slide rail and a cleaning assembly. The slide rail is configured to guide the cleaning assembly to reciprocate in its width direction. To achieve this, at least one set of slide rails 121*a*, 121*b* should be provided at fixed positions in the elevator system on both sides of the movement trajectory of the traction belt 200. The cleaning assembly 110 includes a set of slide blocks 113*a*, 113*b* at both ends thereof. Since the set of slide blocks 113*a*, 113*b* match with the slide rails 121*a*, 121*b* respectively, the cleaning assembly 110 can be slidably installed between the set of slide rails 121*a*, 121*b*.

In addition to the above moving members, the cleaning assembly 110 further includes structural arrangements for achieving its cleaning purpose. Specifically, it has a cleaning opening 111 for the traction belt 200 to pass through, and sand removing members 112*a* and 112*b* installed at the cleaning opening 111.

The above arrangements provide an elevator traction belt cleaning device with both sliding and cleaning functions, so that the cleaning assembly can move associatedly with the traction belt passing through it at the same time of cleaning. Specifically, when it is installed in an elevator system, the cleaning assembly will move associatedly with swaying of the traction belt caused by the operation of the elevator system or a displacement caused by an installation inclination of the traction belt, so that the cleaning assembly always maintains a proper sand removing distance with the traction belt, which effectively takes into account both a sand removing effect and the noise of sand removing, and at the same time improves the service life and replacement cycle of the sand removing member.

The structures and connection relationships of various parts of the elevator traction belt cleaning device will be described below in conjunction with FIGS. 2 to 5. In addition, in order to further improve the reliability, practicability, economy or in consideration of other aspects for improvement, some additional parts may be added, which are also exemplified as follows.

For example, regarding the slide rails and slide blocks mentioned in the above embodiments, considering their cooperation with the application scene of the elevator system and for realizing the purpose of moving the cleaning assembly, the following design scheme may be adopted: as shown in FIG. 2, the slide rails 121*a* and 121*b* mentioned above are configured as concave slide rails, such as C-shaped slide rails; and the slide blocks 113*a* and 113*b* mentioned above are correspondingly configured as convex slide blocks to facilitate insertion into the concave slide rails to achieve stable guidance and movement. In addition, although not shown in the figure, the above design scheme may also be inverted, that is, the slide rails mentioned above are configured as convex slide rails, and the slide blocks mentioned above are correspondingly configured as concave slide blocks, which can also achieve stable guidance and movement between the two.

On this basis, in order to improve the smoothness of movement and noise between the slide rails and the slide blocks, noise reduction members may also be arranged between the two, which may be made of materials such as polytetrafluoroethylene. Taking the elevator traction belt cleaning device 100 shown in FIGS. 2 to 3 as an example, noise reduction bushings 141*a*, 141*b* may be additionally provided for it, and the noise reduction bushings 141*a*, 141*b* are sleeved over the convex slide blocks 113*a*, 113*b* respectively, so that slide contact surfaces between the slide rails 121*a*, 121*b* and the slide blocks 113*a*, 113*b* are separated by the noise reduction bushings 141*a*, 141*b*, thereby avoiding high-noise friction and damage of the slide rails and slide blocks usually made of metal considering the strength problem. Similarly, although not shown in the figure, the above design scheme may also be inverted, that is, the noise reduction bushings mentioned above are arranged on the convex slide rails, which can also improve the smoothness of movement and noise between the two. Furthermore, other structural forms of noise reduction members may also be used. For example, noise reduction liners may be directly arranged on the slide contact surfaces between the slide rails 121*a*, 121*b* and the slide blocks 113*a*, 113*b*, and they are made have a fixed relationship with either the slide rails or the slide blocks. This arrangement can also improve the smoothness of movement and noise between the two.

For another example, regarding the cleaning assembly 110 described in the above embodiment, as a specific structural example, it includes a set of fixed arms 114*a*, 114*b*, with first ends of the two being fixed to the slide block 113*a* respectively, and second ends of the two being fixed to the slide block 113*b* respectively, thereby realizing a stable frame structure. Before the fixing, the fixed arms 114*a* and 114*b* should be spaced apart by a constant distance, and after the fixing, the spacing distance forms the above described cleaning opening 111 through which the traction belt 200 passes. Generally, before the fixing is completed, the size of the cleaning opening 111 can be adjusted by adjusting the fixed positions of the ends of the fixed arms 114*a* and 114*b* on the slide blocks 113*a* and 113*b*. After the fixing is completed, the cleaning opening will have a constant opening size. On one hand, this arrangement makes it possible to adjust the cleaning opening according to the width of the traction belt; on the other hand, under the cooperation of the slide blocks and the slide rails, this arrangement enables a constant gap (a suitable sand removing distance) to be maintained between the traction belt with a determined size and the cleaning opening with a determined size after the traction belt is inserted into the cleaning opening, which can effectively take into account both a sand removing effect and the noise of sand removing, and at the same time can improve the service life and replacement cycle of the sand removing member. Similarly, although these features are described and expanded in the form of separate parts in the example shown in the figure, they can also be integrally formed into a single member, a middle part of which will be regarded as the two fixed arms and the cleaning opening, and two ends of which will be regarded as the slide blocks, which can also achieve the above effects.

For another example, the sand removing members 112*a*, 112*b* of the cleaning assembly 110 described in the above embodiment may be configured as sand removing brushes, which are made of materials such as foam cotton to effectively scrape off the sand particles on the traction belt.

For another example, in order to further improve the noise and service life of the elevator traction belt cleaning device in the process of cleaning the traction belt, further modifications can also be made to it. Specifically, an additional guide assembly 130 may be added near the cleaning opening 111 of the cleaning assembly 110. Such a guide assembly should have a lower coefficient of friction than a brush, and be configured to be able to contact the traction belt 200 which passes through the cleaning opening 111 after the installation is completed and push the traction belt 200 away from the sand removing members, thereby guiding the cleaning assembly 110 to slide along with the movement of the traction belt 200, and at the same time making a proper “sand removing gap” be maintained between the sand removing members 112*a* 112*b* and the traction belt 200. The “sand removing gap” mentioned herein means that there is a gap between the sand removing members 112*a*, 112*b* and the traction belt 200. This gap can not only avoid a direct contact between the sand removing members 112*a*, 112*b* and the traction belt 200, but also can realize effective removing of sand particles on the traction belt 200. For example, if reference is made to regulations on the degree of sand removing in the elevator industry standards, the gap can be set to 2 mm or less.

With continued reference to FIGS. 2 to 5, the guide assembly 130 may be at least one set of rolling members 131*a*, 131*b* (for example, rolling cylinders) and at least one set of rolling member brackets 132*a*, 132*b*, both installed below the cleaning assembly 110. Of course, the above members may also be installed above the cleaning assembly 110. An optimal installation position will change with a change in the running direction of the traction belt caused by the operation of the elevator car. When they contact the traction belt before the cleaning assembly 110 in the running direction of the traction belt, a better effect will be produced. Therefore, installing them on both sides of the cleaning assembly 110 at the same time may also be considered.

Returning to the rolling members 131*a*, 131*b* and the rolling member brackets 132*a*, 132*b*, the rolling members 131*a*, 131*b* are pivotally connected to the rolling member brackets 132*a*, 132*b*, and are installed to the fixed arms 114*a*, 114*b* of the cleaning assembly 110 via the rolling member brackets 132*a*, 132*b*. It should be noted that the gap between the assembled rolling members 131*a*, 131*b* should be smaller than the gap between the sand removing members 112*a*, 112*b*. This arrangement can effectively realize that the rolling members 131*a*, 131*b* first contact the traction belt and then push the traction belt away from the sand removing members 112*a*, 112*b*.

Similarly, although not shown in the figure, another implementation of the guide assembly 130 is also provided herein. The guide assembly 130 may include at least one set of support rods installed to the cleaning assembly 110. For example, the support rods are also installed on the fixed arms 114*a*, 114*b* of the cleaning assembly 110. The gap between the assembled support rods should also be smaller than the gap of the sand removing members, so as to effectively realize that the support rods first contact the traction belt and then push the traction belt away from the sand removing members 112*a*, 112*b*. In addition, in order to reduce the coefficient of friction between the support rods and the traction belt 200, contact surfaces between the support rods and the traction belt 200 passing through the cleaning opening 111 may be configured as curved surfaces.

It should also be known that the elevator traction belt cleaning device and the elevator system provided by the present application and other parts of the elevator system can be designed, manufactured, and sold separately, or they can also be assembled together and then sold as a whole. Either the single pieces formed before the combination or the entirety formed after the combination will fall within the scope of protection of the present application.

In addition, although not shown in the drawings, an embodiment of an elevator system is also provided herein. The elevator system includes the traction belt cleaning device in any of the above embodiments or combinations thereof, and therefore also has various effects brought about by it, which will not be described repeatedly herein. The following will focus on the layout of the traction belt cleaning device in the elevator system and its connection relationships with other parts.

Such an elevator system includes an elevator car, a counterweight, and a traction belt 200 of a traction assembly connected between the elevator car and the counterweight. At this time, the traction belt cleaning device mentioned herein will be fixedly installed in the elevator system on a movement trajectory of the traction belt 200. Due to the sliding function, when the elevator system is running, the cleaning assembly 110 will slide as the position of the traction belt 200 passing through the cleaning opening 111 changes, so that the cleaning assembly 110 always maintains a proper sand removing distance with the traction belt, which effectively takes into account both a sand removing effect and the noise of sand removing, and at the same time improves the service life and replacement cycle of the sand removing member.

More specifically, when the traction belt 200 in the elevator system to which it is applied has an installation inclination, the traction belt cleaning device can be arranged such that the sliding direction of the cleaning assembly 110 thereof corresponds to the inclination direction of the traction belt 200 installed in the elevator system. As a result, a horizontal movement component of the traction belt 200 due to the existence of the inclination angle is substantially consistent with the sliding direction of the cleaning assembly 110, so that the sliding process of the cleaning assembly 110 and the sand removing process coexist smoothly.

In the above examples, the elevator traction belt cleaning device and the elevator system of the present application are mainly described. Although only some of the embodiments of the present application have been described, those skilled in the art should understand that the present application may be implemented in many other forms without departing from the spirit and scope thereof. Therefore, the illustrated examples and embodiments should be regarded as illustrative rather than restrictive, and the present application may cover various modifications and replacements without departing from the spirit and scope of the present application as defined by the appended claims.

What is claimed is:

1. An elevator traction belt cleaning device, comprising:

a set of slide rails installed to fixed positions in an elevator system; and a cleaning assembly comprising:

a set of fixed arms having a cleaning opening for a traction belt to pass through the set of fixed arms;

a sand removing member installed on at least one of the set of fixed arms at the cleaning opening, and a set of slide blocks including a slide block mounted at distal ends of the set of fixed arms;

wherein the cleaning assembly is slidably installed between the set of slide rails through the set of slide blocks slidably received in the set of slide rails.

2. The elevator traction belt cleaning device according to claim 1, further comprising a guide assembly, which is arranged close to the cleaning opening of the cleaning assembly, and which is configured to contact the traction belt passing through the cleaning opening, and guide the cleaning assembly to slide as the traction belt moves, so that a sand removing gap is maintained between the sand removing member and the traction belt.

3. The elevator traction belt cleaning device according to claim 2, wherein the guide assembly is installed above and/or below the cleaning assembly.

4. The elevator traction belt cleaning device according to claim 3, wherein the guide assembly comprises at least one set of rolling members and at least one set of rolling member brackets; the at least one set of rolling member brackets are installed to the cleaning assembly, and the at least one set of rolling members are pivotally connected to the at least one set of rolling member brackets respectively; and a gap between the at least one set of rolling members is smaller than the gap of the sand removing member.

5. The elevator traction belt cleaning device according to claim 3, wherein the guide assembly comprises at least one set of support rods installed to the cleaning assembly; a gap between the at least one set of support rods is smaller than the gap of the sand removing member; and contact surfaces of the at least one set of support rods with the traction belt passing through the cleaning opening are configured as curved surfaces.

6. The elevator traction belt cleaning device according to claim 1, wherein the set of slide rails are configured as concave slide rails or convex slide rails, and the set of slide blocks are correspondingly configured as convex slide blocks or concave slide blocks.

7. The elevator traction belt cleaning device according to claim 5, further comprising noise reduction bushings, which are arranged on slide contact surfaces between the set of slide rails and the set of slide blocks and which are sleeved over the convex slide rails or the convex slide blocks.

8. The elevator traction belt cleaning device according to claim 1, further comprising noise reduction liners, which are arranged on slide contact surfaces between the set of slide rails and the set of slide blocks.

9. The elevator traction belt cleaning device according to claim 1, wherein one of the set of slide blocks is configured to fix first ends of the set of fixed arms, and the other one of the set of slide blocks is configured to fix second ends of the set of fixed arms, and the set of fixed arms are spaced apart from each other to form the cleaning opening for the traction belt to pass through.

10. The elevator traction belt cleaning device according to claim 1, wherein the cleaning opening has a constant opening size.

11. The elevator traction belt cleaning device according to claim 1, wherein the sand removing member is configured as a sand removing brush.

12. An elevator system, comprising:

an elevator car;

a counterweight;

a traction assembly, which comprises a traction belt connected between the elevator car and the counterweight; and the traction belt cleaning device according to claim 1, which is fixedly installed in the elevator system on a movement trajectory of the traction belt;

wherein when the elevator system is running, the cleaning assembly slides as a position of the traction belt passing through the cleaning opening changes.

13. The elevator system according to claim 12, wherein the traction belt cleaning device is fixedly installed to an upper beam of a truss or a counterweight installation bracket of the elevator system on the movement trajectory of the traction belt.

14. The elevator system according to claim 12, wherein a sliding direction of the cleaning assembly corresponds to an inclination direction of the traction belt installed in the elevator system.

* * * * *